(12) United States Patent
Córdova et al.

(10) Patent No.: US 10,995,154 B2
(45) Date of Patent: May 4, 2021

(54) ENVIRONMENTALLY FRIENDLY PROCESS FOR THE PREPARATION OF NANOCELLULOSE AND DERIVATIVES THEREOF

(71) Applicant: Organofuel Sweden AB, Sundsvall (SE)

(72) Inventors: Armando Córdova, Stockholm (SE); Samson Afewerki, Uppsala (SE)

(73) Assignee: Organofuel Sweden AB, Sundsvall (SE)

( * ) Notice: Subject to any disclaimer, the term of this patent is extended or adjusted under 35 U.S.C. 154(b) by 193 days.

(21) Appl. No.: 15/778,945

(22) PCT Filed: Nov. 23, 2016

(86) PCT No.: PCT/EP2016/078578
§ 371 (c)(1),
(2) Date: May 24, 2018

(87) PCT Pub. No.: WO2017/089413
PCT Pub. Date: Jun. 1, 2017

(65) Prior Publication Data
US 2018/0346607 A1    Dec. 6, 2018

(30) Foreign Application Priority Data

Nov. 26, 2015   (SE) .................................. 1551537-2

(51) Int. Cl.
| | |
|---|---|
| C08B 1/06 | (2006.01) |
| C08B 11/00 | (2006.01) |
| C08B 15/05 | (2006.01) |
| C08L 1/26 | (2006.01) |
| C08L 1/08 | (2006.01) |
| C08L 97/02 | (2006.01) |
| B82Y 30/00 | (2011.01) |

(52) U.S. Cl.
CPC ................ *C08B 1/06* (2013.01); *C08B 11/00* (2013.01); *C08B 15/05* (2013.01); *C08L 1/08* (2013.01); *C08L 1/26* (2013.01); *C08L 97/02* (2013.01); *B82Y 30/00* (2013.01)

(58) Field of Classification Search
None
See application file for complete search history.

(56) References Cited

U.S. PATENT DOCUMENTS

2014/0154757 A1   6/2014   Nelson et al.

FOREIGN PATENT DOCUMENTS

| CN | 102182089 A | 9/2011 |
| CN | 103154095 A | 6/2013 |
| EP | 1400625 A2 | 3/2004 |
| WO | 2011086012 A1 | 7/2011 |
| WO | 2011090428 A1 | 7/2011 |
| WO | 2014085729 A1 | 6/2014 |
| WO | 2014085730 A1 | 6/2014 |

OTHER PUBLICATIONS

Abelmouleh, Langmuir, vol. 18, No. 9, 2002. (Year: 2002).*
Tingaut, J. Mater. Chem., 2011, 21, 16066. (Year: 2011).*
Huang, RSC Adv. 2014, 4, 6956-6969. (Year: 2014).*
Bin Li, et a.l, "Cellulose nanocrystals prepared via formic acid hydrolysis followed by TEMPO-mediated oxidation", Carbohydrate Polymers, vol. 133, Nov. 1, 2015, pp. 605-612.
Du Haishunm, et al.: "Preparation and characterization of thermally stable cellulose nanocrystals via a sustainable approach of FeCl3-catalyzed formic acid hydrolysis", Cellulose, Springer Netherlands, Netherlands, vol. 23,No. 4,Jun. 1, 2016, pp. 2389-2407.
Gui-Ling Zhao, et al., "Heterogeneous 'Organoclick' Derivatization of Polysaccharides: Photochemical Thiol-ene Click Modification of Solid Cellulose", Macromolecular Rapid Communications, vol. 31, No. 8, Apr. 20, 2010, pp. 740-744.
International Preliminary Report on Patentability Application No. PCT/EP2016/078578 dated Apr. 11, 2018;Completed: Apr. 11, 2018 9 pages.
Isogai, A., et al., "TEMPO-oxidized cellulose nanofibers." Nanoscale, 2011,3, pp. 71-85.
Lei Dai, et al.,: "The Role of Formic Acid Pretreatment in Improving the Carboxyl Content of Tempo-Oxidized Cellulose." Cellulose Chemistry and Technology. Cellulose Chem. Technol, Jan. 1, 2014, pp. 469-475.
Liu Chaom et al.: "Properties of nanocellulose isolated from corncob residue using sulfuric acid, formic acid, oxidative and mechanical methods." Carbohydrate Polymers, Applied Science Publishers, Ltd. Barking, GB, vol. 151, Jun. 6, 2016, pp. 716-724.
Nair, et al., "High performance green bafflers based on nanocellulose." Sustainable Chemical Processes, Nov. 7, 2014, 2 23.
Osong, H.S, et al., "Processing of wood-based microfibrillated cellulose and nanofibrillated cellulose, and applications relating to papermaking: a review." Cellulose, Oct. 2015.
Yan Chen-Feng, et al., "One-step extraction and functionalization of cellulose nanospheres from lyocell fibers with cellulose II crystal structure." Cellulose, Springer Netherlands, Netherlands, vol. 22, No. 6, Sep. 16, 2015, pp. 3773-3788.
Chinese Office Action Translation to English Application No. 201680068582.4 Completed Jun. 10, 2020.
Chinese Office Action Translation Application No. 201680068582.4 Completed Mar. 20, 2020 10 pages.
Japanese Office Action Translation to English Japanese Patent Application No. 2018-521265 Completed Jul. 31, 2020.
Baba and Y. et al., Preparation of chitosan derivatives containing methylthiocarbamoyl and phenylthiocarbamoyl groups and their selective adsorption of copper(II) over iron(III), Analytical Sciences, 2002, and vol. 18, No. 3 and pp. 359-361.

* cited by examiner

*Primary Examiner* — Layla D Berry
(74) *Attorney, Agent, or Firm* — Welsh IP Law LLC

(57) ABSTRACT

The present disclosure relates to the environmentally preparation of nanocellulose and derivatives thereof. The invention further relates to the preparation of cellulose derivatives.

17 Claims, 6 Drawing Sheets

Figure 1

| entry | silane | time (h) | temp. (°C) | acid (10 wt.-%) | angle |
|---|---|---|---|---|---|
| 1 | a | 24 | 70 | - | 109 |
| 2 | a | 6 | 22 | (S)-tartaric acid | 105 |
| 3 | a | 6 | 70 | (S)-tartaric acid | 115 |
| 4 | b | 6 | 70 | - | 123 |
| 5 | b | 24 | 70 | - | 115 |
| 6 | b | 6 | 70 | (S)-tartaric acid | 125 |
| 7 | b | 24 | 70 | (S)-tartaric acid | 105 |
| 8 | c | 24 | 70 | - | 118 |
| 9 | c | 6 | 70 | (S)-tartaric acid | 126 |

| Entry | silane | Time (h) | Temp. (°C) | Water repellency[a] | Angle |
|---|---|---|---|---|---|
| 1 | b | 6 | 70 | ++++ | 110 |
| 2 | b | 14 | 70 | ++++ | 110 |
| 3 | b | 2 | 90 | - | - |
| 4[b] | b | 6 | 70 | n.d. | n.d. |
| 5[c] | b | 6 | 70 | n.d. | n.d. |
| 6[d] | b | 6 | 70 | - | - |
| 7 | d | 6 | 70 | ++++ | 122 |
| 8[e] | d | 6 | 70 | ++ | n.d. |
| 9 | d | 2 | 70 | ++++ | 115 |
| 10 | d | 1 | 70 | ++++ | 115 |
| 11[b] | d | 3 | 70 | ++++ | 122 |
| 12 | d | 3 | 90 | ++++ | 115 |
| 13[f] | d | 2 | 70 | - | - |
| 14 | a | 6 | 70 | + | 102 |
| 15 | c | 2 | 70 | ++++ | 106 |

[a] Water repellency: - = 5s <t <1 min, + = 1 <t <5 min, ++ = 5 min <t <10 min, +++ = 10 min <t <60 min, ++++ = >60 min. [b] neat reaction. [c] THF as the solvent. [d] EtOH/H$_2$O (25% v/v) as the solvent. [e] The reaction was performed without acid. [f] EtOH as the solvent

ENVIRONMENTALLY FRIENDLY PROCESS FOR THE PREPARATION OF NANOCELLULOSE AND DERIVATIVES THEREOF

TECHNICAL FIELD

The present disclosure relates to the environmentally preparation of nanocellulose and derivatives thereof. The invention further relates to the preparation of cellulose derivatives.

BACKGROUND

Cellulose is the most abundant renewable and sustainable material on planet earth. Besides it relative abundance, it is inexpensive, non-toxic, biodegradable, renewable, reusable, environmentally friendly, sustainable, has excellent mechanical material properties (high strength and high modulus), and low density. Due to the emergence of forest nanotechnology, and the growing interest of sustainability and the more restriction of petroleum-derived materials, there is utmost need of development new production methods and cost-efficient solutions in order to engineer new cellulosic nanomaterials.

Cellulose is widely utilized the forest products industry in research projects and pilot-scale activities, and there is now strong drive to commercialized nanocellulose. There are basically two types of nanocelluloses derived from wood, the cellulose nanofibril (CNF) and the cellulose nanocrystals (CNC). The CNF is spaghetti-like in structure, long and flexible, less than 100 nm in width and several microns in length, have both crystalline and amorphous regions intact. The CNC has a "rice-like" structure, short, rod-like and stiff, length from 100 nm to several microns; the amorphous section in the cellulose chain has been digested during processing, therefore highly crystalline. Potential applications of CNF and CNC include; functional and barrier coatings in paper and paperboard, strength additive in paper and paperboard, films, emulsion, foams, optical devices, adhesive, composites, cement, packaging, oil and gas (drilling), non-woven, textile, and green chemicals [1-3].

Several methods have been used to disrupt cellulosic biomass in order to produce nanocellulose and these include conventional mechanical methods as well as chemical and enzymatic, phosphoric acid, hydrobromic acid, and maleic acid methods.

It is well known that conventional sulfuric acid-hydrolysis of cellulose uses 64% $H_2SO_4$, 45-60° C., 120-150 min to selectively digest the amorphous structure of cellulose, there leaving the crystalline parts, which is then referred to as cellulose nanocrystals (CNC). The fibrillation efficiency of this process is facilitated by the formation of sulfate ester groups on the cellulosic chain. However, it is worth noting that this hydrolysis process is very costly and time consuming, as the hydrolysis needs a purification step, which entails dispersion, centrifugation, dialysis, ultrasonication, and ion exchange.

Traditional processing methods of nanocellulose have only included the mechanical approach using equipment's such as the high-pressure homogenizers, microfluidisers, grinders, and refiners. However, in recent times, researchers have included chemical or enzymatic pretreatment combined with mechanical approach to process nanocellulose. These chemically or enzymatically assisted fibrillation technique considerably reduce the overall amount of energy consumption of nanocellulose. It is well known that appropriate high chemical or enzymatic dosage and longer mechanical treatment time improve fibrillation efficiency.

From an industrial perspective, an ideal process of nanocellulose should be cost-effective, i.e. less energy required without compromising so much with its material properties such as high strength and stiffness, high aspect ratio, light weight, renewable and biodegradable. Extremely high amounts of energy are required to produce nanocellulose, if one is to use solely mechanical treatment approach. Another motivation of this work is to mimic the energy reduction approach as that of the TEMPO method [2]. One of the main drawbacks in relation to processing of nanocellulose is its very high requirement of energy in the process. By introducing chemical pretreatment strategies combined with mechanical shearing, significant amount of energy could be reduced. One of the most proficient methods is the TEMPO-mediated oxidation method, which produces well-individualised nanofibrils with very minimum amount of energy. There is now more concern concerning the toxic nature of the TEMPO chemical system (NaBr/NaClO/TEMPO), as this has an environmental ill-effect due to the presence of chlorine chemistry and the toxicity of NaBr of using this harmful chemicals during processing of nanocellulose. Consequently, there is a need of an environmentally friendly method of preparing nanocellulose.

Moreover, as typical nanocelluloses made from both formic acid hydrolysis and TEMPO-mediated oxidation process are highly sensitive to moisture and water, there is a significant need and of utmost importance to hydrophobize the said nanomaterials by surface functionalization [3], i.e. derivatization, so that their water sensitivity is improved.

SUMMARY

The object of the invention is to provide a more environmentally benign process of preparing nanocellulose and derivatives thereof. This object is achieved by a process comprising the steps of:
i. providing a cellulosic material,
ii. mixing the cellulosic material with formic acid,
iii. heating the reaction mixture to 80-110° C., preferably 90° C.
iv. mechanically treating the reaction mixture by (i) mechanically stirring the reaction mixture, and/or (ii) sonication,
v. diluting the reaction mixture with a solvent, and optionally neutralizing the reaction mixture to pH 6-8, and optionally separation and recovery of the formic acid by centrifugation or filtration prior to diluting or neutralization,
vi. centrifugation, filtration, dialysis and/or washing of the reaction mixture,
vii. high shear homogenization, and optionally freeze-drying the nanocellulose produced in the high-shear homogenization step, and
viii. optionally reacting nanocellulose with one or more silanes preferably in the presence of an organic catalyst, wherein the silane is of formula

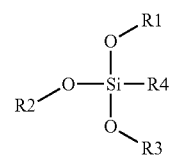

wherein R1, R2 and R3 are selected from alkyl, alkenyl or alkynyl, and wherein R4 is selected from aryl or alkyl, alkenyl, or alkynyl groups which are linear, branched or cyclic, and wherein said alkyl, alkenyl or alkynyl groups are unsubstituted or substituted with SH, halogen, OH, amine, catalyst, amino acid derivatives, antibody and fragments thereof, polymer, natural products, biotin, quinine, quinidine or derivatives thereof, and ix. optionally reacting the silane derivatized nanocellulose produced in the previous step with:
2,2-dimethoxy-2-phenylacetophenone (DMPA), and
thiol compound, olefin compound or alkynyl compound,
wherein the reaction is carried out in the presence of UV-light or heat.

A further object of the invention is to derivatize the nanocellulose prepared according to the above process. This object is achieved by reacting nanocellulose with one or more silanes preferably in the presence of an organic catalyst, wherein the silane is of formula

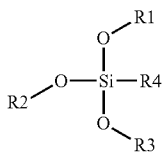

wherein R1, R2 and R3 are selected from alkyl, alkenyl or alkynyl, and wherein R4 is selected from aryl or alkyl, alkenyl, or alkynyl groups which are linear, branched or cyclic, and wherein said alkyl, alkenyl or alkynyl groups are unsubstituted or substituted with SH, halogen, OH, amine, catalyst, amino acid derivatives, antibody and fragments thereof, polymer, natural products, biotin, quinine, quinidine or derivatives thereof. Moreover, the resulting silane derivatized nanocellulose may be reacted with:
2,2-dimethoxy-2-phenylacetophenone (DMPA), and
thiol compound, olefin compound or alkynyl compound
wherein the reaction is carried out in the presence of UV-light or heat,
wherein the thiol compound is preferably selected from a compound of the formula R—SH wherein R is selected from:
alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, polypeptide, antibody, amino acid derivative, peptide, sugar, polysaccharide and biotin derivative, as well as,
aliphatic polyesters, poly(caprolactones), poly(lactide), poly(carboxylate), PEG poly(ethylene glycol), poly(anhydrides), polyamide and co-polymers between the said polymers, and
wherein the olefin compound is preferably selected from a compound of the formula R—CH═CH$_2$ or R—CH═CH—R wherein R is selected from:
alkyl, aryl, cycloalkyl, alkylsubstituted with a hetrocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
aliphatic polyesters, poly(caprolactones), poly(lactide), poly(carboxylate), PEG poly(ethylene glycol), poly(anhydrides), polyamide and co-polymers between the said polymers,
wherein the alkyne compound is preferably selected from a compound of the formula R—C≡CH or R—C≡C—R wherein R is selected from:
alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
aliphatic polyesters, poly(caprolactones), poly(lactide), poly(carboxylate), PEG poly(ethylene glycol), poly(anhydrides), polyamide and co-polymers between the said polymers.

A further object of the invention is to derivatize cellulosic material. This object is achieved by the steps of:
i. reacting cellulosic material with one or more silanes preferably in the presence of an organic catalyst, wherein the silane is of formula

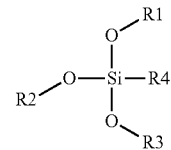

wherein R1, R2 and R3 are selected from alkyl, alkenyl or alkynyl, and wherein R4 is selected from alkyl, alkenyl or alkynyl groups which are linear, branched or cyclic, and wherein said alkyl groups are substituted with SH or amine, and ii. reacting the silane derivatized cellulosic material produced in the previous step with:
2,2-dimethoxy-2-phenylacetophenone (DMPA), and
thiol compound, olefin compound or alkyne compound,
wherein the reaction is carried out in the presence of UV-light or heat,
wherein the thiol compound is preferably selected from a compound of the formula R—SH wherein R is selected from:
alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, polypeptide, antibody, amino acid derivative, peptide, sugar, polysaccharide and biotin derivative, as well as,
aliphatic polyesters, poly(caprolactones), poly(lactide), poly(carboxylate), PEG poly(ethylene glycol), poly(anhydrides), polyamide and co-polymers between the said polymers, and
wherein the olefin compound is preferably selected from a compound of the formula R—CH═CH$_2$ or R—CH═CH—R wherein R is selected from:
alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
aliphatic polyesters, poly(caprolactones), poly(lactide), poly(carboxylate), PEG poly(ethylene glycol), poly(anhydrides), polyamide and co-polymers between the said polymers, and wherein the alkyne compound is preferably selected from a compound of the formula R—C≡CH or R—C≡C—R wherein R is selected from:
  alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
  aliphatic polyesters, poly(caprolactones), poly(lactide), poly(carboxylate), PEG poly(ethylene glycol), poly (anhydrides), polyamide and co-polymers between the said polymers.

BRIEF DESCRIPTION OF THE DRAWINGS

FIG. 1—Procedure for modification of cellulose
FIG. 2—Procedure for the acid catalyzed silylation
FIG. 3—Procedure for the thiol-ene 'click' reaction with olefin compounds
FIGS. 4 & 5—Procedure for the thiol-ene 'click' reaction with thiol compounds
FIG. 6—Acid catalyzed screening of allyltrimethoxysilylation to 3-phenylpropionalcohol
FIG. 7—Acid catalyzed (3-mercaptopropyl)trimethoxysilylation to 3-phenylpropionalcohol

DETAILED DESCRIPTION

Figure 2:
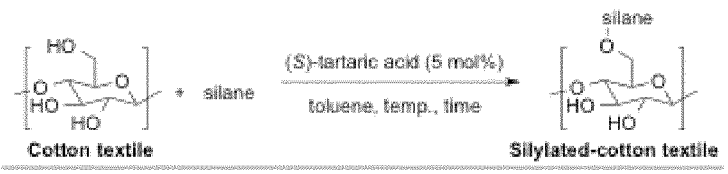
Figure 2:

The present invention relates to a process for the preparation of nanocellulose and derivatives thereof.
Nanocellulose is prepared by a process comprising the steps of:
  i. providing a cellulosic material,
  ii. mixing the cellulosic material with formic acid,
  iii. heating the reaction mixture to 80-110° C., preferably 90° C.
  iv. mechanically treating the reaction mixture by (i) mechanically stirring the reaction mixture, and/or (ii) sonication,
  v. diluting the reaction mixture with a solvent, and optionally neutralizing the reaction mixture to pH 6-8, and optionally separation and recovery of the formic acid by centrifugation or filtration prior to diluting or neutralization,
  vi. centrifugation, filtration, dialysis and/or washing of the reaction mixture,
  vii. high shear homogenization, and optionally freeze-drying the nanocellulose produced in the high-shear homogenization step, and The formic acid may be concentrated formic acid. The mechanical treatment is preferably by mechanically stirring the reaction mixture. The mechanically stirring may be carried out at 1500-4800 rpm, preferably 2400 rpm. Moreover, the mechanical stirring is carried out for 1-48 hours, preferably for 24-48 hours, more preferably for 24 h. The mechanical treatment may also be achieved by sonication for 0.5-2 h hours, preferably for 1 h. In specific examples, the mechanical treatment is achieved with both mechanically stirring and sonication.

The solvent in which the reaction mixture is diluted is preferably water and the reaction mixture may also be neutralized to pH 6-8, preferably to pH 7, with an aqueous base such as aqueous NaOH.

Centrifugation is performed at 1000-12000 rpm, preferable 6000 rpm, and wherein the centrifugation for is carried out for at least 1 minute, preferably for 5-60 minutes, more preferably 30 min. Moreover, centrifugation and decanting the supernatant may repeated at least once, preferably at least 3 times.

The high shear homogenization is performed at 15000-30000 rpm, preferably at 15000 rpm. High shear homogenization is carried out for 90-180 minutes, preferably 90 minutes. The resulting nanocellulose produced in the high-shear homogenization step may be freeze-dried.

Nanocellulose may prepared from cellulosic material which is selected from cellulose derived from biomass, bacteria, animals, paper, algae, lignocellulose, textile, and/or recycled materials. Biomass from plants such as wood or cotton is preferred.

The present invention further relates to a process of derivatising nanocellulose material. The derivatization is performed on the nanocellulose prepared from the above described steps i-vii and comprises the steps of:
  viii. reacting nanocellulose with one or more silanes preferably in the presence of an organic catalyst, wherein the silane is of formula

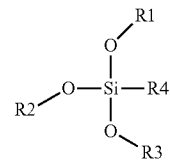

wherein R1, R2 and R3 are selected from alkyl, alkenyl or alkynyl, and wherein R4 is selected from aryl or alkyl, alkenyl, or alkynyl groups which are linear, branched or cyclic, and wherein said aryl, alkyl, alkenyl or alkynyl groups are unsubstituted or substituted with SH, halogen, OH, amine, catalyst, amino acid derivatives, antibody and fragments thereof, polymer, natural products, biotin, quinine, quinidine or derivatives thereof.

The silane may also be of formula

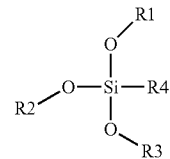

wherein R1, R2 and R3 are selected from alkyl, and wherein R4 is selected from alkyl or alkenyl group which is linear, branched or cyclic, wherein said alkyl or alkenyl group is unsubstituted or substituted with SH or NH$_2$. Specific examples of silanes which may be used in the derivatization reaction in step viii are mercaptopropyltrimethoxysilane, allyltrimethoxysilane, triethoxyvinylsilane and hexadecyltrimethoxysilane, The reaction in step viii may be carried out in the presence of an organic catalyst such as an organic acid. Examples of organic acids are which may be used in the present invention are for example tartaric acid, malic acid, citric acid, lactic acid, p-toluenesulfonic acid and benzene sulfonic acid. In specific examples of the present invention (S)-tartaric acid may be used at concentrations such as 1-30 mol-% and 5-10 mol-%.

The reaction in step viii may be carried out for at least 0.5 hour, preferably for 1-14 hours. The reaction is carried out an elevated temperature, preferably at 60-90° C.

The silane derivatized nanocellulose produced in step viii may be subjected to a further derivatization step (step ix). In this step, the silane derivatized nanocellulose is reacted with:

2,2-dimethoxy-2-phenylacetophenone (DMPA), and thiol compound, olefin compound or alkyne compound, wherein the reaction is carried out in the presence of UV-light or heat, wherein the thiol compound is preferably selected from a compound of the formula R—SH wherein R is selected from:

alkyl, aryl, cycloalkyl, alkylsubstituted with a heterocycle, $CH_2$-heterocycle, heterocycle, quinidine derivative, quinine derivative, pyridyl derivative, taxol derivative, capcaisine derivative, polypeptide, antibody, amino acid derivative, peptide, sugar, polysaccharide and biotin derivative, as well as, aliphatic polyesters, poly(caprolactones), poly(lactide), poly(carboxylate), PEG poly(ethylene glycol), poly(anhydrides), polyamide and co-polymers between the said polymers, and wherein the olefin compound is preferably selected from a compound of the formula R—CH=$CH_2$ or R—CH=CH—R wherein R is selected from:

alkyl, aryl, cycloalkyl, alkylsubstituted with a heterocycle, $CH_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as, aliphatic polyesters, poly(caprolactones), poly(lactide), poly(carboxylate), PEG poly(ethylene glycol), poly(anhydrides), polyamide and co-polymers between the said polymers, wherein the alkyne compound is preferably selected from a compound of the formula R—C≡CH or R—C≡C—R wherein R is selected from:

alkyl, aryl, cycloalkyl, alkylsubstituted with a heterocycle, $CH_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as, aliphatic polyesters, poly(caprolactones), poly(lactide), poly(carboxylate), PEG poly(ethylene glycol), poly(anhydrides), polyamide and co-polymers between the said polymers.

The thiol compound to be used in step ix may be selected from a compound of the formula R—$CH_2$—SH wherein R is selected from one of the following groups:

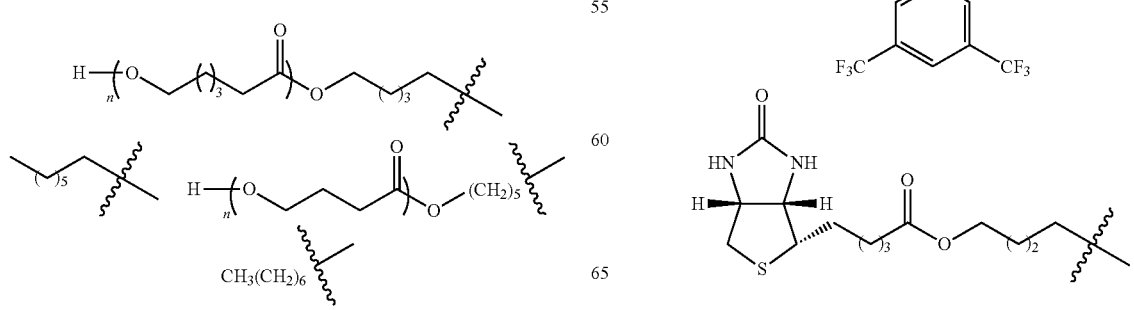

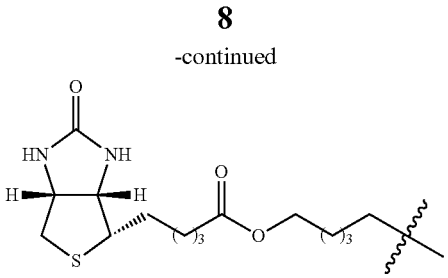

The olefin compound to be used in step ix is selected from a compound of the formula R—CH=$CH_2$ wherein R is selected from one of the following groups:

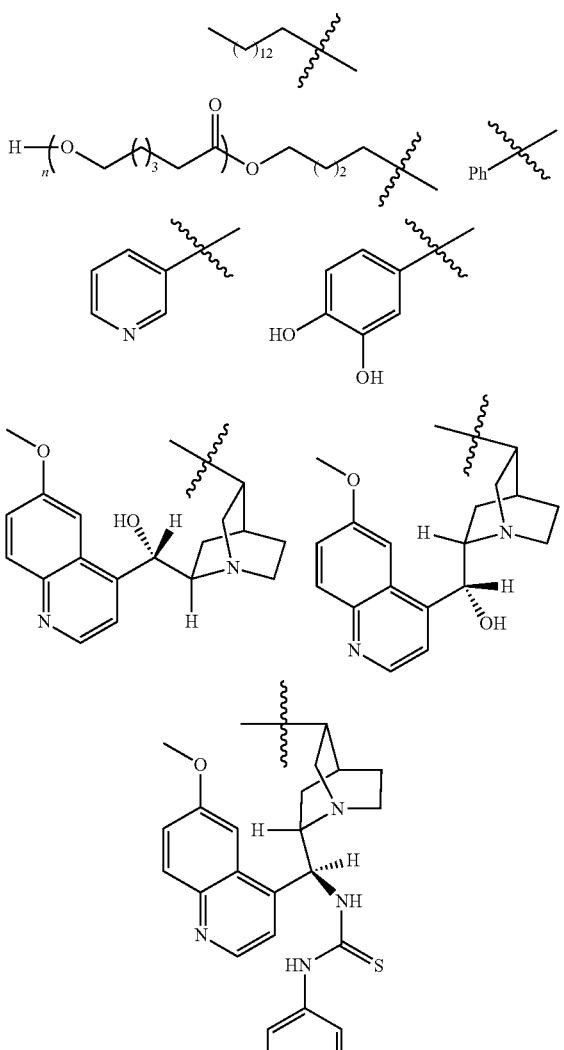

or wherein the olefin is

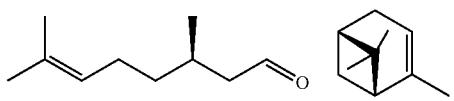

The present invention further relates to derivatising cellulosic material selected from nanocellulose or cellulose derived from biomass, bacteria, animals, paper, algae, lignocellulose, textile, and/or recycled materials. The derivatising reaction comprises the steps of:
  i. reacting cellulosic material with one or more silanes preferably in the presence of an organic catalyst, wherein the silane is of formula

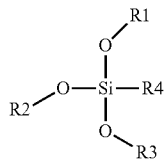

wherein R1, R2 and R3 are selected from alkyl, alkenyl or alkynyl, and wherein R4 is selected from alkyl, alkenyl or alkynyl groups which are linear, branched or cyclic, and wherein said alkyl groups are substituted with SH or amine, and
  ii. reacting the silane derivatized cellulosic material produced in the previous step with:
    2,2-dimethoxy-2-phenylacetophenone (DMPA), and thiol compound, olefin compound or alkyne compound, wherein the reaction is carried out in the presence of UV-light or heat,
  wherein the thiol compound is preferably selected from a compound of the formula R—SH wherein R is selected from:
    alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, polypeptide, antibody, amino acid derivative, peptide, sugar, polysaccharide and biotin derivative, as well as,
    aliphatic polyesters, poly(caprolactones), poly(lactide), poly(carboxylate), PEG poly(ethylene glycol), poly(anhydrides), polyamide and co-polymers between the said polymers, and
  wherein the olefin compound is preferably selected from a compound of the formula R—CH=CH$_2$ or R—CH=CH—R wherein R is selected from:
    alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
    aliphatic polyesters, poly(caprolactones), poly(lactide), poly(carboxylate), PEG poly(ethylene glycol), poly(anhydrides), polyamide and co-polymers between the said polymers, and
  wherein the alkyne compound is preferably selected from a compound of the formula R—C≡CH or R—C≡C—R wherein R is selected from:
    alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
    aliphatic polyesters, poly(caprolactones), poly(lactide), poly(carboxylate), PEG poly(ethylene glycol), poly(anhydrides), polyamide and co-polymers between the said polymers.

Specific examples of silanes which may be used in the derivatization reaction in step i are mercaptopropyltrimethoxysilane, allyltrimethoxysilane and triethoxyvinylsilane.

The thiol compound to be used in step ii may be selected from a compound of the formula R—CH$_2$—SH wherein R is selected from one of the following groups:

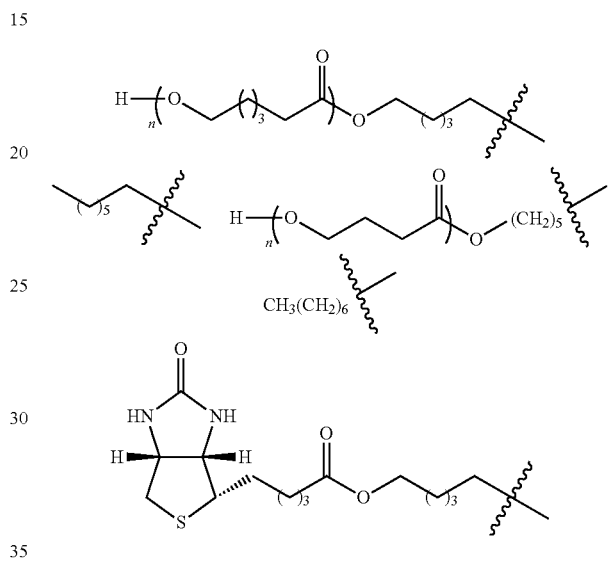

The olefin compound to be used in step ii is selected from a compound of the formula R—CH=CH$_2$ wherein R is selected from one of the following groups:

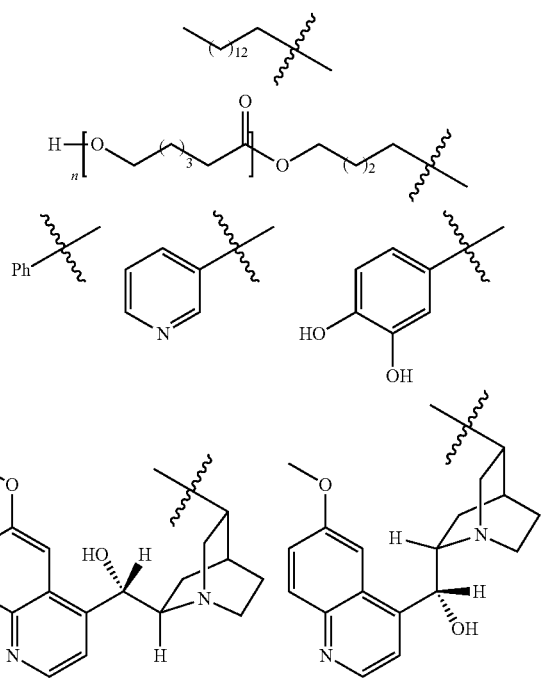

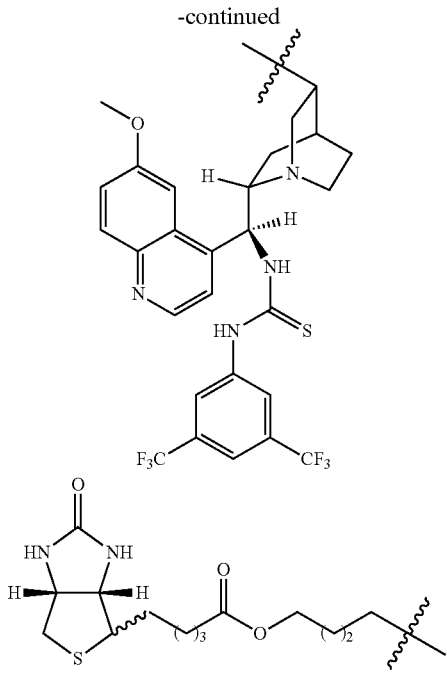

or wherein the olefin is

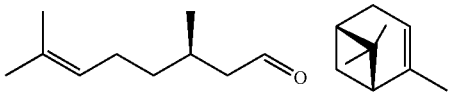

Specific examples of derivatization reactions of cellulosic materials as well as the preparation of nanocellulose is disclosed in the following specific examples of the present invention.

EXAMPLES

General Experimental Conditions

Infrared (IR) spectra were recorded on Thermo Fisher Nicolet 6700 FT-IR spectrometer, $v_{max}$ in $cm^{-1}$. Bands are characterized as broad (br), strong (s), medium (m), or weak (w).

$^1$H NMR spectra were recorded on a Bruker Avance (500 MHz or 400 MHz) spectrometer. Chemical shifts are reported in ppm from tetramethylsilane with the solvent resonance resulting from incomplete deuterium incorporation as the internal standard ($CDCl_3$: δ 7.26 ppm). Data are reported as follows: chemical shift, multiplicity (s=singlet, d=doublet, q=quartet, br=broad, m=multiplet), and coupling constants (Hz), integration. $^{13}$C NMR spectra were recorded on a Bruker Avance (125.8 MHz or 100 MHz) spectrometer with complete proton decoupling, Chemical shifts are reported in ppm from tetramethylsilane with the solvent resonance as the internal standard ($CDCl_3$: δ 77.16 ppm).

GC analysis was performed on GC Varian 3300x, chiral, BETA-DEX 325 column (30 m, 0.25 mm×0.25 μM), with He as carrier gas. High-resolution mass spectrometry was performed on Agilent 6520 Accurate-Mass QTOF LC/MS (positive mode). All reactions were performed under anhydrous conditions glassware was dried in an oven at 160° C. and carried out under a nitrogen atmosphere.

Chemicals and solvents were either purchased puriss p. A. from commercial suppliers or were purified by standard techniques. Commercial reagents were used as purchased without any further purification.

MUNKTELL FILTER PAPER was used as cellulose source in examples 1-25. Pieces cut from the paper was dried overnight at 40° C. Examples 1-25 was also repeated by exchanging cellulose with nanocellulose produced in Example 26.

The tartaric acid was dried in a desiccator over phosphorus pentoxide

Aluminum sheet silica gel plates (Fluka 60 F254) were used for thin-layer chromatography (TLC), and the compounds were visualized by irradiation with UV light (254 nm) or by treatment with a solution of phosphomolybdic acid (25 g), $Ce(SO_4)_2 \cdot H_2O$ (10 g), conc. $H_2SO_4$ (60 mL), and $H_2O$ (940 mL), followed by heating. Purification of the product was carried out by flash column chromatography using silica gel (Fluka 60, particle size 0.040-0.063 mm).

Example 1—Procedure for Modification of Cellulose by (3-mercaptopropyl)trimethoxysilane To a flask containing filter paper (500 mg) was added toluene (7 mL), followed by addition of a solution of (3-mercaptopropyl)trimethoxysilane (1.59 g, 8.1 mmol, 2.9 equiv.) in toluene (3 mL). The reaction was heated to 70° C. and stirred for 24 h. Afterwards the paper was washed with dichloromethane (50 mL) and extracted by Soxhlet using dichloromethane. Then the paper was dried overnight under vacuum. See entry 1 in FIG. 1.

Example 2—Procedure for the Acid Catalyzed Modification of Cellulose by (3-mercaptopropyl)trimethoxysilane To a flask containing filter paper (500 mg) and (S)-tartaric acid (10 wt %, 50 mg) was added toluene (7 mL), followed by addition of a solution of (3-mercaptopropyl)trimethoxysilane (1.59 g, 8.1 mmol, 2.9 equiv.) in toluene (3 mL). The reaction was heated to 70° C. and stirred for 6 h. Afterwards the paper was washed with dichloromethane (50 mL) and extracted by Soxhlet using dichloromethane. Then the paper was dried overnight under vacuum. See entry 3 in FIG. 1.

Example 3—Procedure for Modification of Cellulose by Allyltrimethoxysilane

To a flask containing filter paper (500 mg) was added toluene (7 mL), followed by addition of a solution of allyltrimethoxysilane (1.31 g, 8.1 mmol, 2.9 equiv.) in toluene (3 mL). The reaction was heated to 70° C. and stirred for 24 h. Afterwards the paper was washed with dichloromethane (50 mL) and extracted by Soxhlet using dichloromethane. Then the paper was dried overnight under vacuum. See entry 5 in FIG. 1.

Example 4—Procedure for the Acid Catalyzed Modification of Cellulose by Allyltrimethoxysilane To a flask containing filter paper (500 mg) and (S)-tartaric acid (10 wt %, 50 mg) was added toluene (7 mL), followed by addition of a solution of allyltrimethoxysilane (1.31 g, 8.1 mmol, 2.9 equiv.) in toluene (3 mL). The reaction was heated to 70° C. and stirred for 6 h. Afterwards the paper was washed with dichloromethane (50 mL) and extracted by Soxhlet using dichloromethane. Then the paper was dried overnight under vacuum. See entry 6 in FIG. 1.

Example 5—Procedure for Modification of Cellulose by Triethoxyvinylsilane

To a flask containing filter paper (500 mg) was added toluene (7 mL), followed by addition of a solution of triethoxvinylsilane (1.54 g, 8.1 mmol, 2.9 equiv.) in toluene (3 mL). The reaction was heated to 70° C. and stirred for 24 h. Afterwards the paper was washed with dichloromethane (50 mL) and extracted by Soxhlet using dichloromethane. Then the paper was dried overnight under vacuum. See entry 8 in FIG. 1.

Example 6—Procedure for the Acid Catalyzed Modification of Cellulose by Triethoxyvinylsilane To a flask containing filter paper (500 mg) and (S)-tartaric acid (10 wt %, 50 mg) was added toluene (7 mL), followed by addition of a solution of triethoxvinylsilane (1.54 g, 8.1 mmol, 2.9 equiv.) in toluene (3 mL). The reaction was heated to 70° C. and stirred for 6 h. Afterwards the paper was washed with dichloromethane (50 mL) and extracted by Soxhlet using dichloromethane. Then the paper was dried overnight under vacuum. See entry 9 in FIG. 1.

Example 7—Procedure for the Acid Catalyzed Silylation of Avicel and Cotton

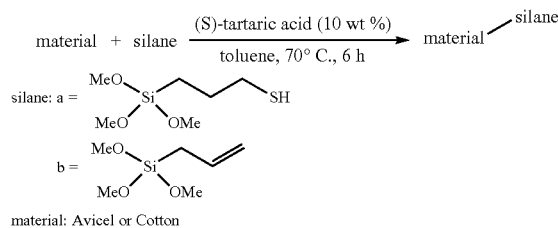

To a flask containing of the Avicel or Cotton (500 mg) and (S)-tartaric acid (10 wt %, 50 mg) was added toluene (7 mL), followed by addition of a solution of the silane a orb (8.1 mmol, 2.9 equiv.) in toluene (3 mL). The reaction was heated to 70° C. and stirred for 6 h. Afterwards the material was washed with dichloromethane (50 mL) and extracted by Soxhlet using dichloromethane. Then the paper was dried overnight under vacuum.

The above described acid catalyzed silylation was also conducted on cotton textile by exchanging (S)-tartaric acid (10 wt %) with (S)-tartaric acid (5 wt %). Additionally, the temperature was varied between 1, 2, 3, 6 and 14 hours. Furthermore, the reaction was heated to either 70° C. or 90° C. Moreover, compounds of formula a, b, c and d were used as silylation reagents. The specific experimental conditions as well as the water repellencies of the resulting siyated-cotton textiles are shown in FIG. 2.

Example 8—Procedure for Synthesis of Polycaprolactone-Ene Ring Opening Polymerization of ε-Caprolactone To an oven dried vial (24 mL) containing ε-caprolactone (1.14 g, 10.0 mmol, 1.0 equiv.) in toluene (5 mL) were added hex-5-en-1-ol (38.1 mg, 0.38 mmol, 3.8 mol %) and triazabicyclodecene (26.4 mg, 0.19 mmol, 1.9 mol %) and the reaction was heated to 70° C. and stirred for 30 min. Afterwards the reaction mixture was cooled to room temperature and transferred to a solution of cold methanol and filtered. The white product was dried under vacuum, giving polycaprolactone-ene as white solid (1.3 g).

Example 9—Procedure for Synthesis of Polycaprolactone-Thiol Ring Opening Polymerization of ε-Caprolactone To an oven dried vial (24 mL) containing ε-caprolactone (1.14 g, 10.0 mmol, 1.0 equiv.) in toluene (5 mL) were added 6-mercaptohexan-1-ol (51.0 mg, 0.38 mmol, 3.8 mol %) and triazabicyclodecene (26.4 mg, 0.19 mmol, 1.9 mol %) and the reaction was heated to 70° C. and stirred for 30 min. Afterwards the reaction mixture was cooled to room temperature and transferred to a solution of cold methanol and filtered. The white product was dried under vacuum, giving polycaprolactone-thiol as white solid (1.2 g).

Figure 3:
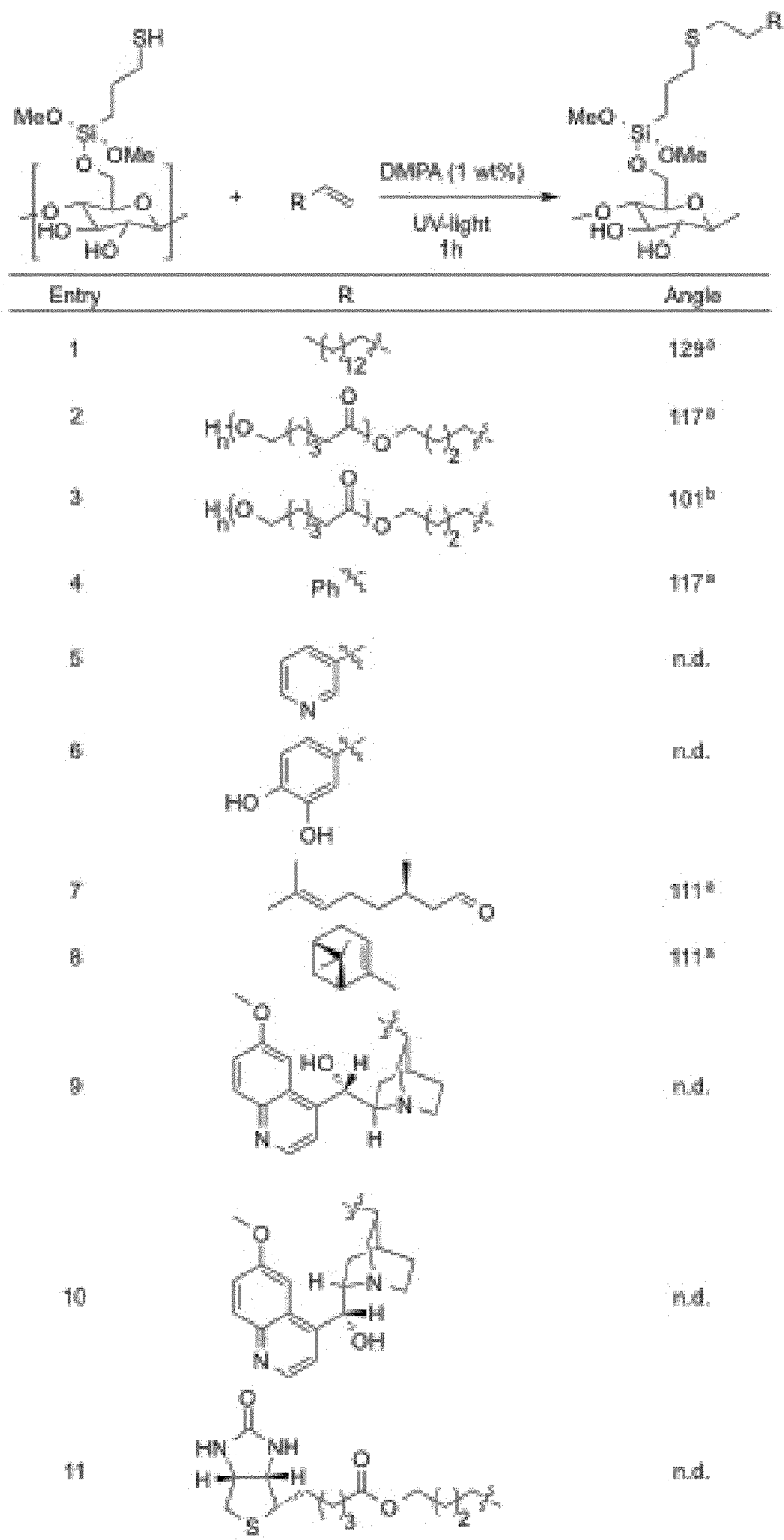

Example 10—Procedure for the thiol-ene 'Click' Reaction Between Cellulose Modified (3-mercaptopropyl)trimethoxysilane and 1-hexadecene To a mixture of modified cellulose (around 30 mg) and 1-hexadecene (448.9 mg, 2.0 mmol) was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 1 in FIG. 3.

Example 11—Procedure for the thiol-ene 'Click' Reaction Between Cellulose Modified (3-mercaptopropyl)trimethoxysilane and styrene To a mixture of modified cellulose (around 30 mg) and styrene (208.3 mg, 2.0 mmol) was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 4 in FIG. 3.

Example 12—Procedure for the thiol-ene 'Click' Reaction Between Cellulose Modified (3-mercaptopropyl)trimethoxysilane and 3-vinylpyridine To a mixture of modified cellulose (around 30 mg) and 3-vinylpyridine (238.3 mg, 2 mmol) was added DMPA (1 wt %, 2.3 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 5 in FIG. 3.

Example 13—Procedure for the thiol-ene 'Click' Reaction Between Cellulose Modified (3-mercaptopropyl)trimethoxysilane and 4-vinylbenzene-1,2-diol To a mixture of modified cellulose (around 30 mg) and 4-vinylbenzene-1,2-diol (23 mg, 0.17 mmol) in a minimum amount of DMF was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 6 in FIG. 3.

Example 14—Procedure for the thiol-ene 'Click' Reaction Between Cellulose Modified (3-mercaptopropyl)trimethoxysilane and citronellal To a mixture of modified cellulose (around 30 mg) and citronellal (308.5 mg, 2.0 mmol) was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 7 in FIG. 3.

Example 15—Procedure for the thiol-ene 'Click' Reaction Between Cellulose Modified (3-mercaptopropyl)trimethoxysilane and (R)-α-pinen To a mixture of modified cellulose (around 30 mg) and (R)-α-pinen (272.5 mg, 2.0 mmol) was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 8 in FIG. 3.

Example 16—Procedure for the thiol-ene 'Click' Reaction Between Cellulose Modified (3-mercaptopropyl)trimethoxysilane and polycaprolactone-ene To a mixture of modified cellulose (around 30 mg) and polycaprolactone-ene (60 mg) in minimum amount of DMF was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 2 and 3 in FIG. 3.

Example 17—Procedure for the thiol-ene 'Click' Reaction Between Cellulose Modified (3-mercaptopropyl)trimethoxysilane and Quinine or Quinidine To a mixture of modified cellulose (around 30 mg) and Quinine or Quinidine (120 mg) in minimum amount of DMF was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entries 9 and 10 in FIG. 3.

Example 18—Procedure for the thiol-ene 'Click' Reaction Between Cellulose Modified (3-mercaptopropyl)trimethoxysilane and Biotin To a mixture of modified cellulose (around 30 mg) and Biotin (60 mg, 1.0 equiv.) in minimum amount of DMF was added DMPA (1 wt %, 6.0 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 11 in FIG. 3.

Example 19—Procedure for the thiol-ene 'Click' Reaction Between Avicel and Cotton Modified (3-mercaptopropyl)trimethoxysilane with Quinidine To a mixture of modified Avicel or Cotton (around 100 mg) and Quinidine (300 mg) in a minimum amount of DMF was added DMPA (1 wt %, 10 mg). Then the reaction was irradiated with UV-lamp (UV-B bulb, TL20W/12, 20 W) for 1 h. Afterwards the material was extracted (Soxhlet) with dichloromethane. Then the material was dried overnight under vacuum.

Example 20—Procedure for the thiol-ene 'Click' Reaction Between Avicel and Cotton Modified (3-mercaptopropyl)trimethoxysilane with Hexadecene To a mixture of modified Avicel or Cotton (around 100 mg) and Hexadecene (1.7 mL, 6 mmol) was added DMPA (1 wt %, 10 mg). Then the reaction was irradiated with UV-lamp (UV-B bulb, TL20W/12, 20 W) for 1 h. Afterwards the material was extracted (Soxhlet) with dichloromethane. Then the material was dried overnight under vacuum.

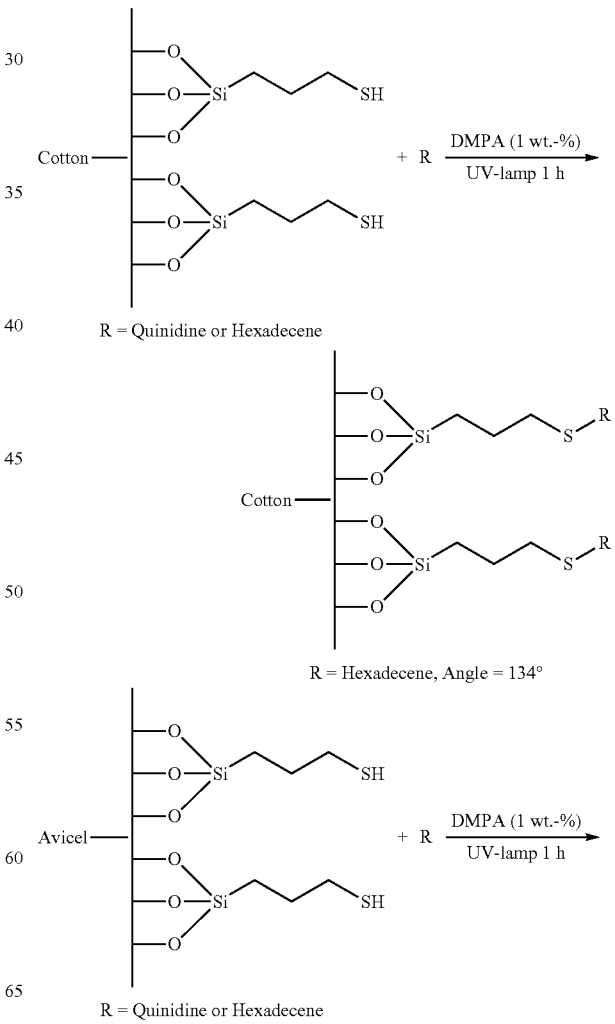

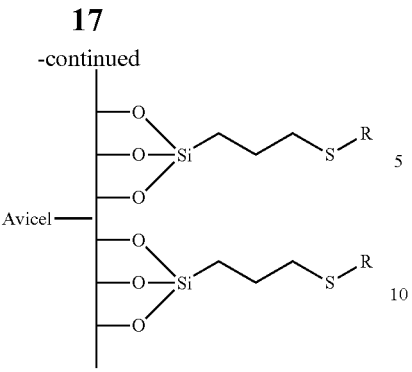

Figure 4:
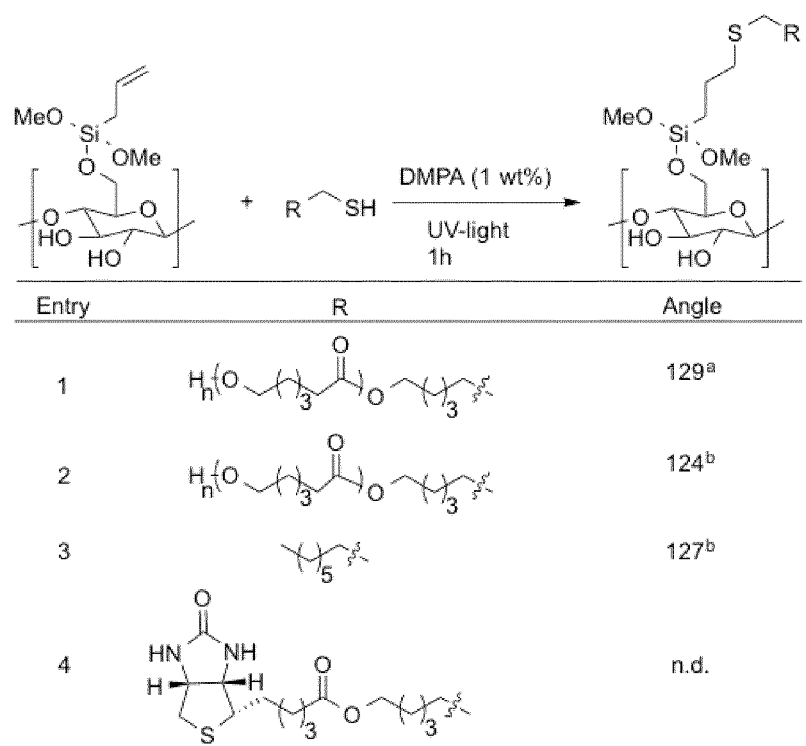
Figure 5:
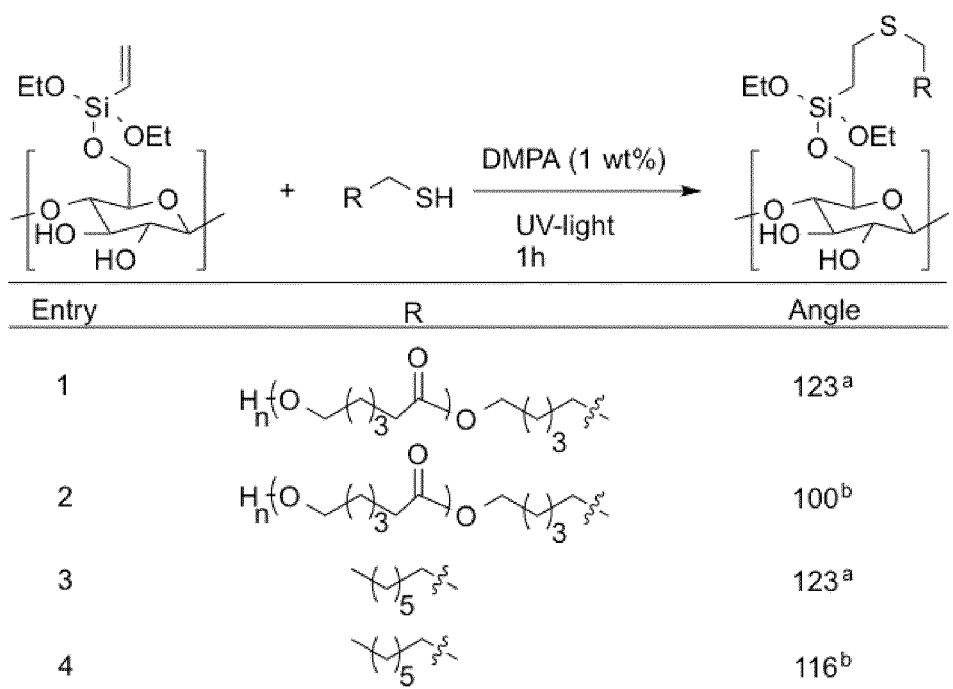

Example 21—Procedure for the thiol-ene 'Click' Reaction Between Cellulose Modified Allyltrimethoxysilane or Triethoxyvinylsilane and Polycaprolactone-Thiol To a mixture of modified cellulose (around 30 mg) and polycaprolactone-thiol (60 mg) in minimum amount of DMF was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 1 and 2 for in FIG. 4 for 'click' reaction between cellulose modified allyltrimethoxysilane and polycaprolactone-thiol. See entry 1 and 2 for in FIG. 5 for 'click' reaction between cellulose modified triethoxyvinylsilane and polycaprolactone-thiol.

Example 22—Procedure for the thiol-ene 'Click' Reaction Between Cellulose Modified Allyltrimethoxysilane or Triethoxyvinylsilane and 1-octanethiol To a mixture of modified cellulose (around 30 mg) and octanethiol (292.6 mg, 2.0 mmol) was added DMPA (1 wt %, 4.5 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 3 in FIG. 4 for 'click' reaction between cellulose modified allyltrimethoxysilane and 1-octanethiol. See entry 3 and 4 for in FIG. 5 for 'click' reaction between cellulose modified triethoxyvinylsilane and 1-octanethiol.

Example 23—Procedure for the thiol-ene 'Click' Reaction Between Cellulose Modified Allyltrimethoxysilane and Biotin To a mixture of modified cellulose (around 30 mg) and Biotin (60 mg, 1.0 equiv.) in minimum amount of DMF was added DMPA (1 wt %, 6.0 mg). Then the reaction was irradiated with UV-lamp (UV-B bulb, TL20W/12, 20 W) for 1 h. Afterwards the filter-paper was extracted (Soxhlet) with dichloromethane. Then the paper was dried overnight under vacuum. See entry 4 in FIG. 4 for 'click' reaction between cellulose modified allyltrimethoxysilane and Biotin.

Figure 6:
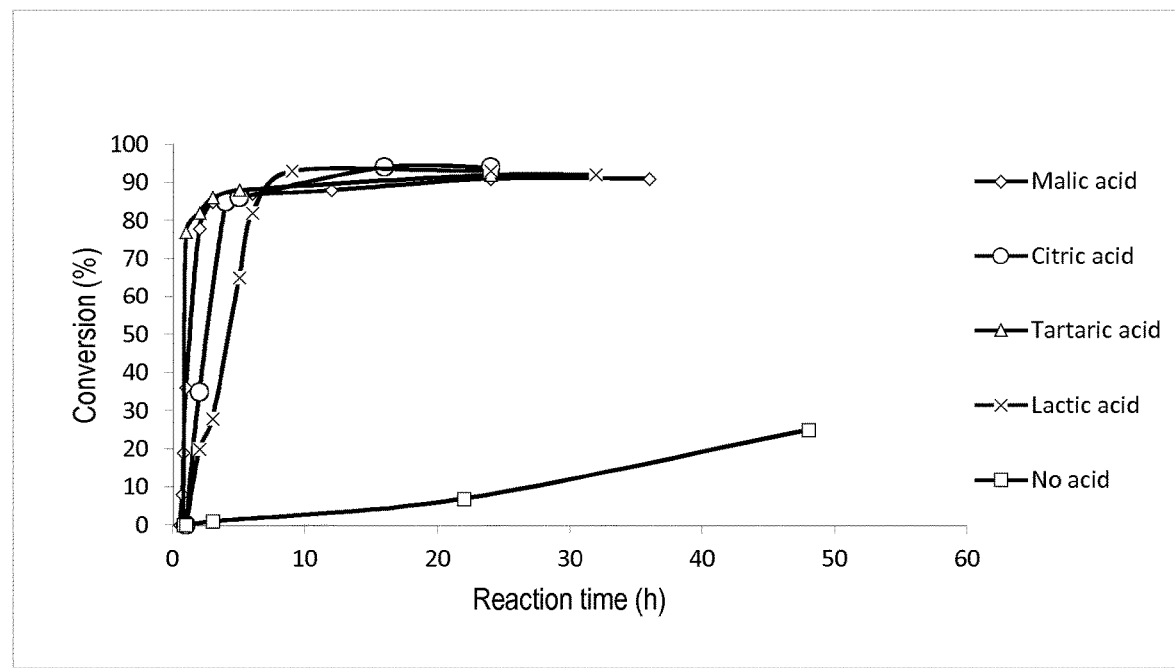

Example 24—General Procedure for the Acid Catalyzed Screening of Allyltrimethoxysilylation to 3-phenylpropionalcohol To an oven dried vial (8 mL) containing 3-phenylpropionalcohol (68.1 mg, 0.5 mmol, 1.0 equiv.) in toluene (1.0 mL) were added allyltrimethoxysilane (162.3 mg, 1.0 mmol, 2.0 equiv.) and acid (0.05 mmol, 10 mol %). The reaction was heated to 70° C. and monitored by Gas chromatography analysis. See FIG. 6 for the conversion (%) with malic acid, citric acid, tartaric acid, lactic acid and no acid.

allyldimethoxy(3-phenylpropoxy)silane

Figure 7:
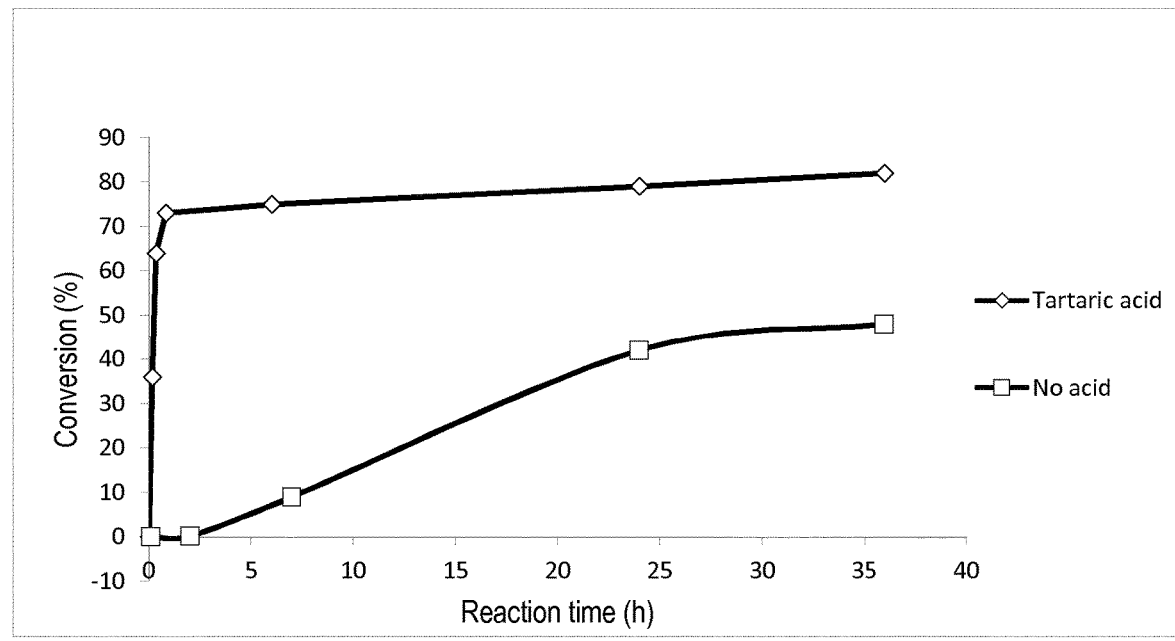

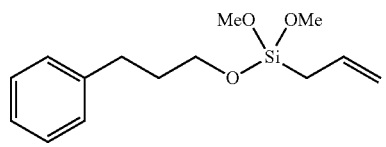 [SMILES: C=CC[Si](OC)(OC)OCCCc1ccccc1]

colorless oil; $^1$H NMR (500 MHz, CDCl$_3$): δ 7.35-7.27 (m, 2H), 7.25-7.17 (m, 3H), 5.93-5.81 (m, 1H), 5.10-5.01 (m, 1H), 5.01-4.94 (m, 1H), 3.87-3.79 (m, 2H), 3.61 (s, 6H), 2.76-2.70 (m, 2H), 1.98-1.87 (m, 2H), 1.76-1.68 (m, 2H); $^{13}$C NMR (125 MHz, CDCl$_3$): δ 142.0, 132.4, 128.6, 128.4, 125.9, 115.1, 62.4, 50.8, 34.1, 32.1, 17.5; HRMS (ESI$^+$) [M+Na]$^+$ calcd for C$_{14}$H$_{22}$O$_3$SiNa$^+$: 289.1230, found: 289.1235;

Example 25—General Procedure for the Acid Catalyzed (3-mercaptopropyl)trimethoxysilylation to 3-phenylpropionalcohol To an oven dried vial (8 mL) containing 3-phenylpropionalcohol (68.1 mg, 0.5 mmol, 1.0 equiv.) in toluene (1.0 mL) were added (3-mercaptopropyl)trimethoxysilane (196.3 mg, 1.0 mmol, 2.0 equiv.) and (S)-tartaric acid (7.5 mg, 0.05 mmol, 10 mol %). The reaction was heated to 70° C. and monitored by Gas chromatography analysis. See FIG. 7 for the conversion (%) with tartaric acid.

3-(dimethoxy(3-phenylpropoxy)-propane-1-thiol

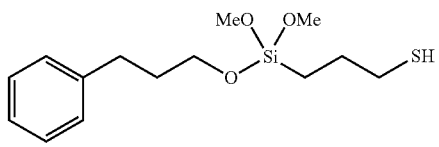 [SMILES: CO[Si](CCCS)(OC)OCCCc1ccccc1]

colorless oil; $^1$H NMR (500 MHz, CDCl$_3$): δ 7.33-7.26 (m, 2H), 7.24-7.17 (m, 3H), 3.83-3.76 (m, 2H), 3.58 (m, 6H), 2.75-2.67 (m, 2H), 2.56 (q, J=14.9, 7.4 Hz, 2H), 1.97-1.85 (m, 2H), 1.79-1.70 (m, 2H), 1.38-1.31 (m, 1H), 0.81-0.73 (m, 2H); $^{13}$C NMR (125 MHz, CDCl$_3$): δ 142.0, 128.6, 128.5, 125.9, 62.2, 50.7, 34.2, 32.1, 27.7, 27.7, 8.7; HRMS (ESI$^+$) [M+Na]$^+$ calcd for C$_{14}$H$_{24}$O$_3$SSiNa$^+$: 323.1108, found: 323.1118;

Example 26—Process for the Preparation of Nanocellulose

The sulphite mass (333.33 g, 15% water content, 50 g dry sample) was dissolved in concentrated formic acid (1 L) the mixture was further heated to 90° C. and mechanically stirred using IKA RW 20 digital with 2,400 rpm for 24 h. Subsequently, the reaction was cooled to room temperature and further sonicated for 1 h using BANDELIN SONOREX DIGITEC. Then the reaction mixture was diluted with water (4 L) and then neutralized to pH=7 by NaOH (aq. 1M). Afterwards the reaction mixture was centrifuged with EBA 21 Hettich ZENTRIFUGEN with 6,000 rpm for 10 min and the water decanted away. The heterogeneous mixture was further diluted with water and centrifuged; this procedure was repeated three times. The material was further homogenized with IKA T 25 ULTRA TURRAX High Speed with 15,000 rpm for 90 min.

Examples 27-52—Derivatization of Nanocellulose

The resulting nanocellulose is subjected to the same reaction condition as in examples 1-25 in order to prepare the corresponding derivatives of nanocellulose, i.e. cellulose, Avicel or cotton is exchanged with nanocellulose. Furthermore, nanocellulose (as well as cellulose and cotton textile) may be derivatized with an aminoalkoxysilane as indicated in the following example.

Example 53—Silylation with (3-Aminopropyl)trimethoxysilane

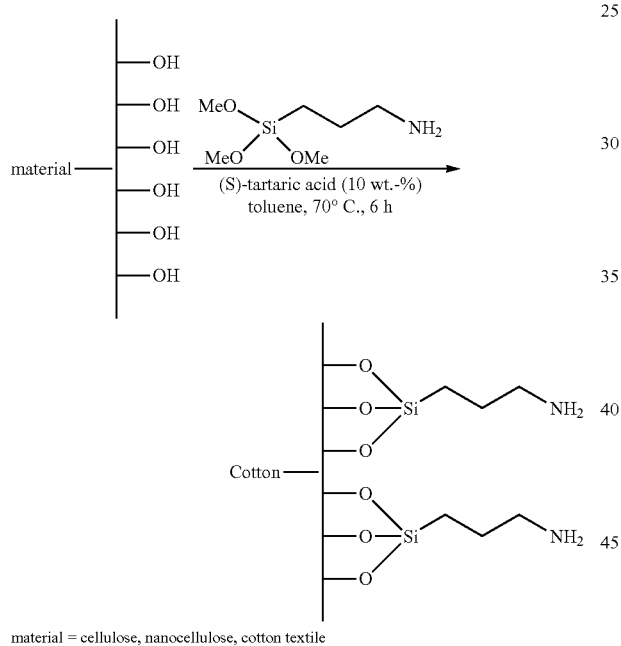

material = cellulose, nanocellulose, cotton textile

The preparation of silylated material started with the addition of dry toluene (20 mL) to the material (1.0 g), followed by addition of a solution of 3-aminopropyltrimethoxysilane (2.7 mL) in toluene (10 mL). The mixture was stirred under nitrogen for 10 minutes, and then refluxed for 24 h. The mixture was allowed to cool to room temperature and the solid was collected by filtration and washed several times with toluene, ethanol, acetone and dichloromethane to remove any unreacted precursor. The material was further dried under vacuum providing the amino functionalized material.

REFERENCES

1. Osong, H. S et al. (2015) Processing of wood-based microfibrillated cellulose and nanofibrillated cellulose, and applications relating to papermaking: a review. Cellulose, 2015, DOI 10.1007/s10570-015-0798-5
2. Isogai, A. et al. (2011) TEMPO-oxidized cellulose nanofibers. Nanoscale, 2011, 3, 71
3. Nair et al. (2014) High performance green barriers based on nanocellulose. Sustainable Chemical Processes 2014, 2 23.

The invention claimed is:

1. A process of derivatizing cellulosic material, comprising the steps of:
   viii. reacting cellulosic material with one or more silanes to produce a silane derivatized nanocellulose, wherein the silane is of formula

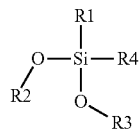

wherein R1, R2 and R3 are selected from alkyl, alkenyl or alkynyl, and wherein R4 is selected from alkyl, alkenyl or alkynyl groups which are linear, branched or cyclic, and wherein said R4 alkyl groups are substituted with SH or NH2,
wherein the reaction in step viii is carried out in the presence of an organic catalyst,
wherein the organic catalyst is an organic acid selected from tartaric acid, malic acid, citric acid, lactic acid and p-toluenesulfonic acid, and
   ix. reacting the silane derivatized cellulosic material produced in step viii with:
   2,2-dimethoxy-2-phenylacetophenone (DMPA), and
   thiol compound, olefin compound or alkyne compound,
wherein the reaction is carried out in the presence of UV-light or heat,
wherein the thiol compound is selected from a compound of the formula R—SH wherein R is selected from:
   alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, polypeptide, antibody, amino acid derivative, peptide, sugar, polysaccharide and biotin derivative, as well as,
   aliphatic polyesters, poly(caprolactones), poly(lactide), poly(carboxylate), PEG poly(ethylene glycol), poly(anhydrides), polyamide and co-polymers between the said polymers, and
wherein the olefin compound is selected from a compound of the formula CH=CH$_2$ or R—CH=CH—R wherein R is selected from:
   alkyl, aryl, cycloalkyl, alkylsubstituted with a heterocycle, CH$_2$-heterocycle, heterocycle, quinidine derivative, quinine derivative, pyridyl derivative, taxol derivative, capcaisine derivative, proline derivative, amino acid derivative, peptide, sugar, polysaccharide, biotin derivative, as well as,
   aliphatic polyesters, poly(caprolactones), poly(lactide), poly(carboxylate), PEG poly(ethylene glycol), poly(anhydrides), polyamide and co-polymers between the said polymers, and
wherein the alkyne compound is selected from a compound of the formula R—C≡CH or R—C≡C—R wherein R is selected from:

alkyl, aryl, cycloalkyl, alkylsubstituted with a heterocycle, CH$_2$-heterocycle, heterocycle, quinidine derivative, quinine derivative, pyridyl derivative, taxol derivative, capsaicine derivative, proline derivative, amino acid derivative, peptide, sugar, polysaccharide, biotin derivative, as well as, aliphatic polyesters, poly(caprolactones), poly(lactide), poly(carboxylate), PEG poly(ethylene glycol), poly(anhydrides), polyamide and co-polymers between the said polymers.

2. The process according to claim 1, wherein the silane is of formula

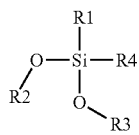

and wherein R1, R2 and R3 are selected from alkyl, and wherein R4 is selected from alkyl or alkenyl group which is linear, branched or cyclic, wherein said R4 alkyl or alkenyl group is unsubstituted or substituted with SH or NH$_2$.

3. The process according to claim 2, wherein the silanes in step viii are selected from mercaptopropyltrimethoxysilane, allyltrimethoxysilane, triethoxyvinylsilane, hexadecyltrimethoxysilane and (3-aminopropyl)trimethoxysilane).

4. The process according to claim 1, wherein the organic catalyst is (S)-tartaric acid, or 5 mol-%-10 mol-% (S)-tartaric acid.

5. The process according to claim 1, wherein the reaction in step viii is carried for 1-14 hours, and the reaction is carried out at 60-90° C.

6. The process according to claim 1, comprising the step of:

ix. reacting the silane derivatized nanocellulose produced in step viii with:
2,2-dimethoxy-2-phenylacetophenone (DMPA), and
thiol compound,
wherein the reaction is carried out in the presence of UV-light or heat,
wherein the thiol compound is selected from a compound of formula R—CH$_2$—SH wherein R is selected from one of the following groups:

7. The process according to claim 1, comprising the step of:

ix. reacting the silane derivatized nanocellulose produced in step viii—with:
2,2-dimethoxy-2-phenylacetophenone (DMPA), and
olefin compound,
wherein the reaction is carried out in the presence of UV-light or heat, and
wherein the olefin compound is selected from a compound of the formula R—CH=CH$_2$, wherein R is selected from one of the following groups:

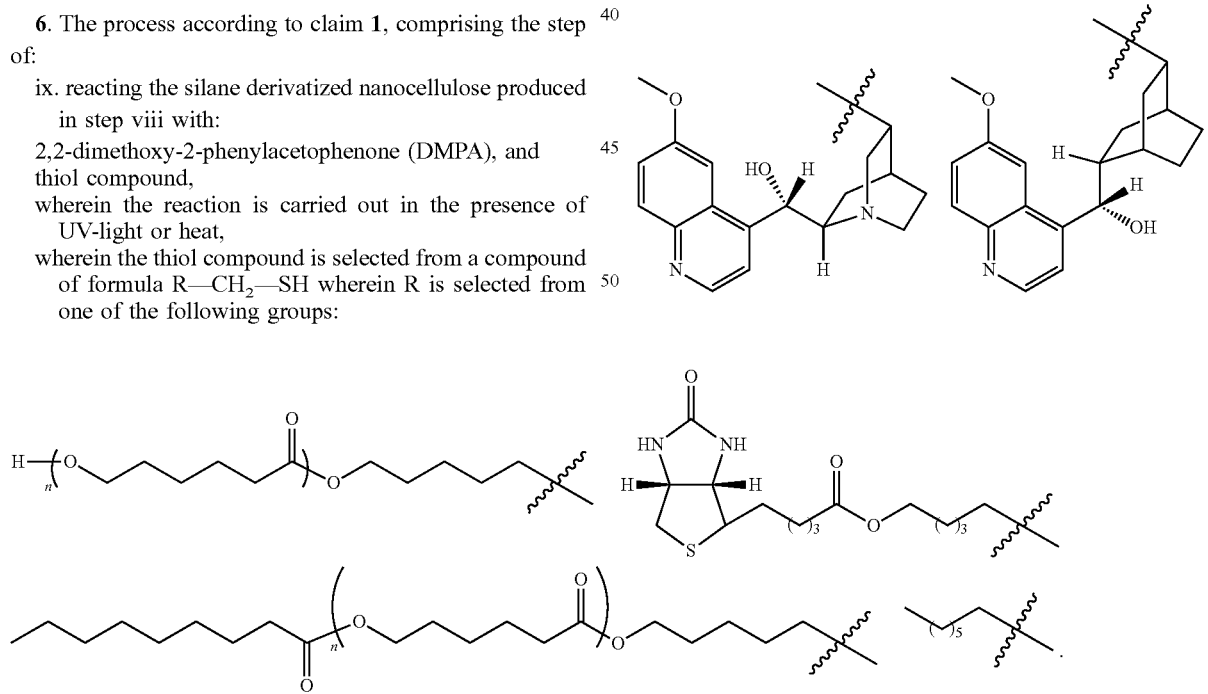

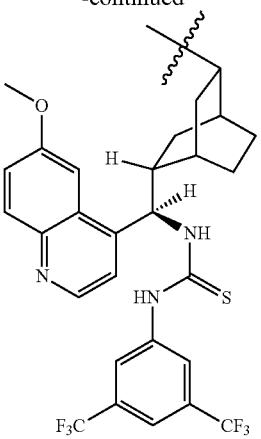

or wherein the olefin is a compound of formula

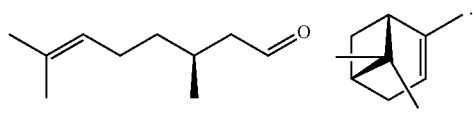

8. The process according to claim 1, wherein the reaction is carried out in UV-light.

9. The process of derivatizing cellulosic material according to claim 1, wherein the cellulosic material is prepared according to a process for the preparation of nanocellulose and derivatives thereof, comprising the steps of:
  i. providing a cellulosic material,
  ii. mixing the cellulosic material with formic acid,
  iii. heating the reaction mixture to 80-110° C.
  iv. mechanically treating the reaction mixture,
  v. diluting the reaction mixture with a solvent,
  vi. centrifugation, filtration, and one or more of dialysis and washing of the reaction mixture,
  vii. high shear homogenization.

10. The process according to claim 9, wherein the mechanically treating the reaction mixture in step iv is by mechanically stirring the reaction mixture, carried out at 1500-4800 rpm, and wherein the mechanical stirring is carried out for 1-48 hours.

11. The process according to claim 9, wherein the mechanically treating the reaction mixture in step iv is by sonication for 0.5-2 hours.

12. The process according to claim 9, wherein the mechanically treating the reaction mixture in step iv is by mechanically stirring the reaction mixture as well as sonication for at least for 0.5 hours, and wherein the mechanically stirring is carried out at 1500-4800 rpm for at least 1 hours.

13. The process according to claim 1, wherein the cellulosic material is selected from cellulose derived from biomass, bacteria, animals, algae, lignocellulose, paper, textile, and/or recycled materials.

14. The process according to claim 1, wherein the biomass is selected from plants.

15. The process according to claim 10, wherein the mechanically treating the reaction mixture in step iv is by sonication for 0.5-2 hours.

16. The process according to any claim 10, wherein the mechanically treating the reaction mixture in step iv is by mechanically stirring the reaction mixture as well as sonication for at least for 0.5 hours, and wherein the mechanically stirring is carried out at 1500-4800 rpm for at least 1 hours.

17. The process according to any claim 11, wherein the mechanically treating the reaction mixture in step iv is by mechanically stirring the reaction mixture as well as sonication for at least for 0.5 hours, and wherein the mechanically stirring is carried out at 1500-4800 rpm for at least 1 hours.

* * * * *